United States Patent [19]

Frederickson et al.

[11] Patent Number: 5,367,900
[45] Date of Patent: Nov. 29, 1994

[54] CAN TESTER

[75] Inventors: Dale W. Frederickson, Lindstrom; Robert F. Meyer, Minneapolis; Joseph G. Anton, Brooklyn Park, all of Minn.

[73] Assignee: The Pillsbury Company, Minneapolis, Minn.

[21] Appl. No.: 59,999

[22] Filed: May 10, 1993

[51] Int. Cl.⁵ .................................................. G01B 5/16
[52] U.S. Cl. ........................................ 73/52; 73/712; 73/833
[58] Field of Search ................. 73/52; 33/712, 772, 33/783, 784, 832, 833

[56] References Cited

U.S. PATENT DOCUMENTS

| | | | |
|---|---|---|---|
| 3,880,749 | 4/1975 | Ramsay | 73/52 |
| 4,898,023 | 2/1990 | Yamada et al. | 73/52 |
| 5,148,611 | 9/1992 | Raetzel | 33/712 |

Primary Examiner—Thomas P. Noland
Assistant Examiner—Michael J. Brock
Attorney, Agent, or Firm—Kinney & Lange

[57] ABSTRACT

The present invention includes a can tester having a main body for holding a can, a mechanism for positioning and securing the can, a movable measuring portion and a mechanism for moving the movable measuring portion. The mechanism for moving the slidable measuring portion includes a first component and a second component substantially perpendicular to the first component. The present invention also includes a method for measuring a pressurization of retorted cans.

11 Claims, 3 Drawing Sheets

CAN TESTER

BACKGROUND OF THE INVENTION

The present invention relates to a device for testing cans and to a method for measuring the internal pressurization of cans.

Uniformly retorting containers of food in an industrial canning process has posed formidable problems of quality control. The formidable problems have included identifying a small number of cans that are either underpressurized or overpressurized after being retorted, before the cans are opened by an end user. Cans that are under too much pressure following a retorting step are dangerous for an end user because the cans may explode. At the very least, cans under excessive pressure are extremely inconvenient to use because when the cans are opened, food is likely to be propelled out of the cans.

Cans may also be underpressurized because an improperly formulated mixture is placed in a particular can or because the can has not been adequately retorted. An improperly formulated mixture is unacceptable to an end user because it is not what the user expected. Additionally, a can that has not been sufficiently retorted poses a health hazard because the can has not been subjected to conditions that kill pathogenic microbes.

It is desirable then for an industrial canner to have a method of testing a suitable number of cans to determine whether the retorting process has been satisfactorily performed. One testing method has included a use of cans having a series of ridges and valleys pressed into the cans and extending radially around the cans. The ridges and valleys are formed on the can in order to provide the can with a mechanism for stretching or for being compressed.

Once a group of cans has been filled with food and retorted, a statistically significant number of cans are selected for testing. The distance between the crown of a ridge and a base of the valley on each can is measured with a hand held instrument that measures length. Manually measuring cans by this method has been unsatisfactory because the method is not standardized. In the manual measurement of can length, a human tester manually employs the measuring instrument, touching it to the can with one hand while holding the can in another hand. If the tester does not have extremely steady hands or cannot draw a completely straight line along the ridges and valleys of the can, or cannot center the measuring instrument with respect to the axial center of the can, the results will be inaccurate. Also, because each tester has his or her own style of performing the test, comparing results among testers is not practical.

SUMMARY OF THE INVENTION

The present invention includes a device for testing cans that includes a main body having a base, a first side panel attached to the base, and a second side panel opposing the first side panel attached to the base. The device also includes a movable measuring instrument portion. The measuring instrument portion is positioned in the main body when measuring lengths of a can. The device also includes a first mechanism for moving the measuring instrument portion between the first and the second side panels and a second mechanism for moving the measuring instrument portion parallel to the second side panel and perpendicular to the first side panel. The device additionally includes a mechanism for positioning and securing cans between the first and the second side panels. The present invention also includes a method for measuring pressurization in a can after retorting the can.

DETAILED DESCRIPTION OF THE REFERRED EMBODIMENTS

Figure 1:
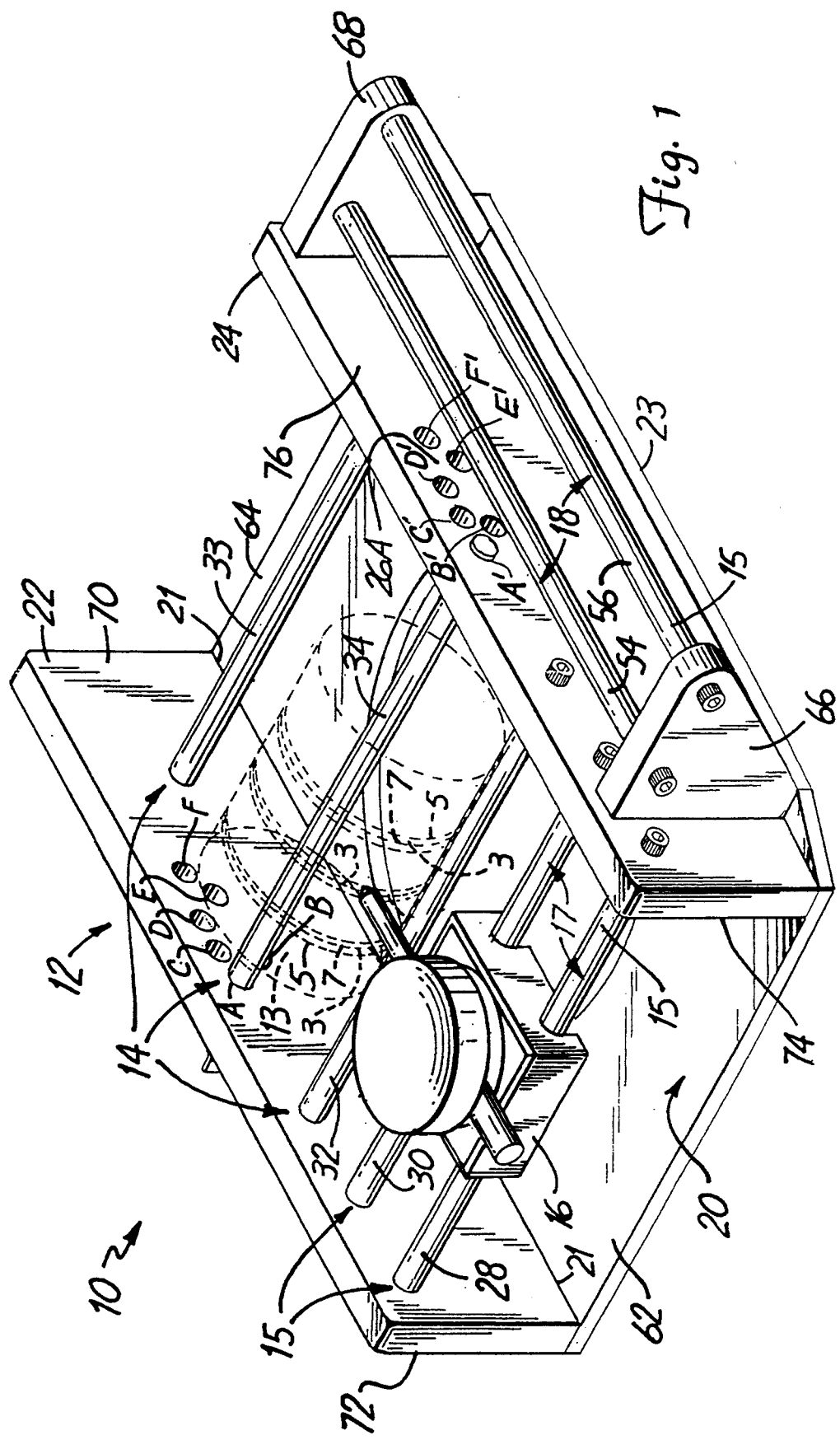
FIG. 1 shows a perspective view of one embodiment of the improved can tester of the present invention.

The can tester of the present invention, illustrated generally at 10 in FIG. 1, includes a main body 12 for holding a can 13, a mechanism 14 for positioning and securing the can 13, a movable measuring portion 16 and a mechanism 15 for moving the movable measuring portion 16, the mechanism 15 having a first component 17 and a second component 18 substantially perpendicular to the first component 17. The present invention also includes a method for measuring a relative pressurization of retorted cans.

The can tester device 10 of the present invention is an improvement over existing methods of testing cans because the can tester device 10 permits measurements of length along the can to be standardized. The can tester device 10 spatially relates a movable instrument portion 16 measuring the length of the can 13 to the can 13 in a manner that is not subject to change due to a particular individual performing the test. Using the can tester device 10, the spacial relationship between the can 13 and measuring portion 16 is not changed for cans of varying diameter either.

The main body 12 of the can tester 10 includes a base 20 having opposing ends 21 and 23, respectively, a first side panel 22 attached to the base 20 proximate to end 21, and a second side panel 24 opposing the first side panel 22 and attached to the base 20 proximate to end 23.

The main body 12 also includes a first open end 62 and a second open end 64 opposing the first open end 62. The first and the second open ends 62 and 64 are adjacent to the ends 21 and 23 of the base 20.

The first side panel 22 includes an interior surface 70 facing the second side panel 24 and an exterior surface 72 opposing the interior surface 70. The second side panel 24 includes an interior surface 74 facing the first side panel 22 and an exterior surface 76 opposing the interior surface 74. Preferably, the first and the second side panels 22 and 24 have substantially the same thickness.

The main body 12 is suitably made of any rigid material. In one embodiment, the main body 12 is made of aluminum.

Figure 2:
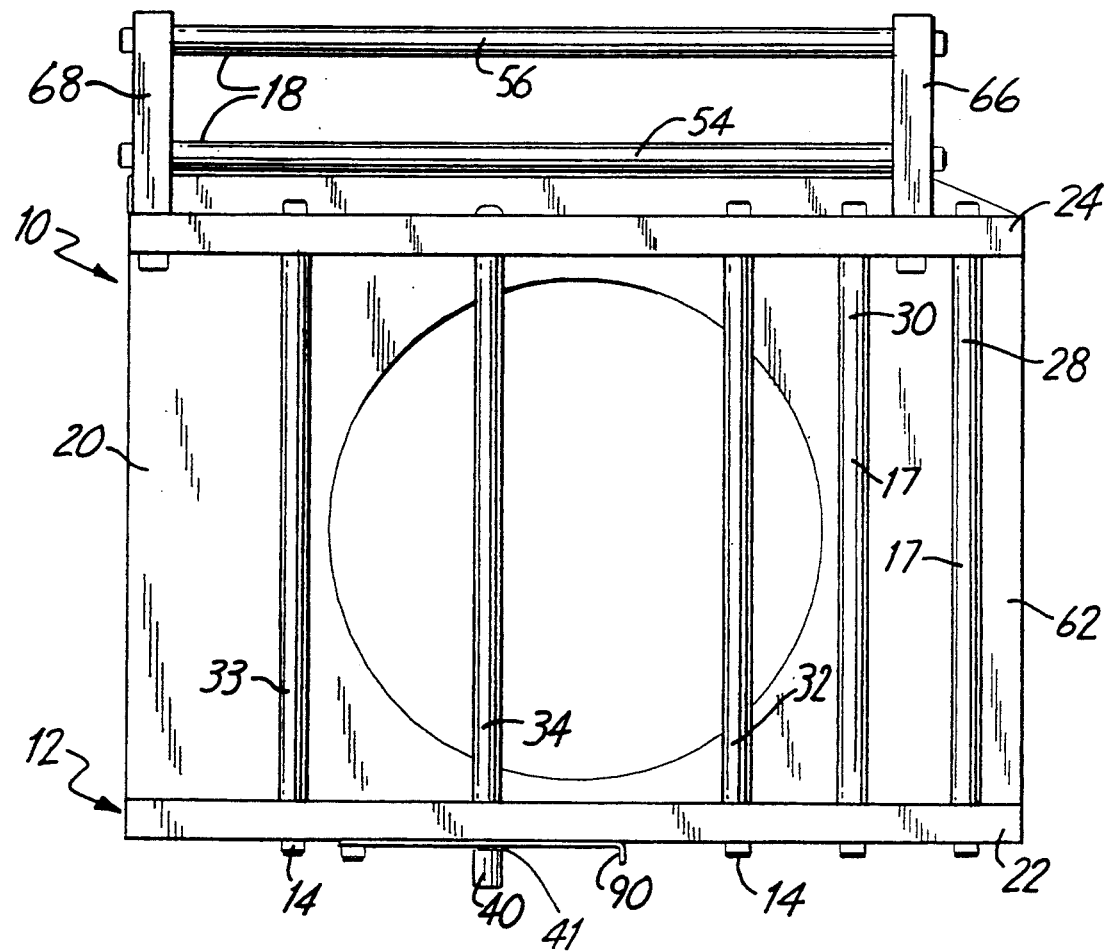
FIG. 2 shows a plan view of one embodiment of the improved can tester.

The mechanism 14 for positioning and securing the can 13 in the tester 10 includes a first rod 32, a second rod 34 and a third rod 33 that are each secured in the first 22 and the second 24 side panels, as shown in FIG. 2. Once secured in the side panels 22 and 24, the rods 32, 33 and 34 span the base 20. The second rod, a movable rod, 34 is positioned between the first rod 32 and the third rod 33.

The mechanism 14 also includes holes A, B, C, D, E and F that are bored in the first side panel 22 and holes A', B', C', D', E' and F' that are bored in the second side panel 24. The holes A, B, C, D, E and F are in alignment with the holes A', B', C', D', E' and F', respectively, as illustrated in FIG. 1.

The second rod 34 is movable being positionable within any pair of the aligned and opposing holes A, A', B, B', C, C', D, D', E, E' and F, F'. The aligned holes into which the second rod 34 is moved depends upon the diameter of the can 13 to be measured. In one preferred embodiment, the holes A, B, C, D, E and F and holes A', B', C', D', E' and F' are selectively positioned so that the second movable rod 34 and the stationary rod 32 selectively position and secure cans having diameters typically used in the canning industry. For instance, the second rod 34 is positioned in the holes B and B' when a can having a diameter of 3 3/16 inches is to be secured and tested. The second rod 34 is positioned in the holes D and D' when a can having a diameter of 3 7/16 inches is to be secured and tested. The second rod 34 is positioned in holes E and E' to position and secure cans having a diameter of 4 1/16 inches. The second rod 34 is positioned in the holes F and F' to secure cans having a diameter of 4¼ inches. For the can 13 having the largest diameter, the second rod 34 is removed from the can tester 10.

Figure 4:
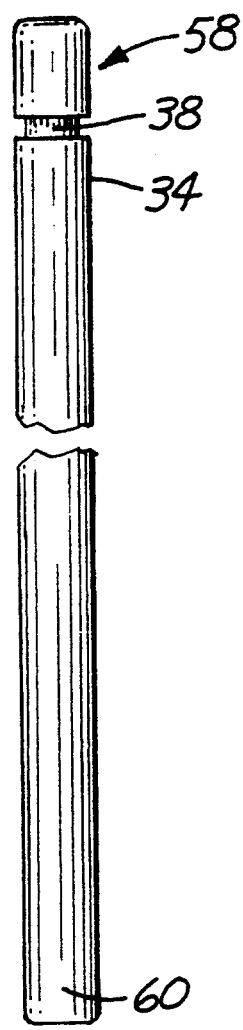
FIG. 4 shows a perspective view of a second rod of the improved can tester.

The second movable rod 34, illustrated in FIG. 4, includes a first end 58, a second end 60 opposing the first end 58 and a radial groove 38 that is positioned proximate to the first end 58 of the second rod 34. The second movable rod 34 has a diameter that is less than the diameter of the opposing aligned holes A, A', B, B', C, C', D, D', E, E', and F, F'. Thus, the second movable rod 34 is movable radially within the holes and along the holes'0 axis once positioned in one the pairs of opposing aligned holes.

Figure 3:
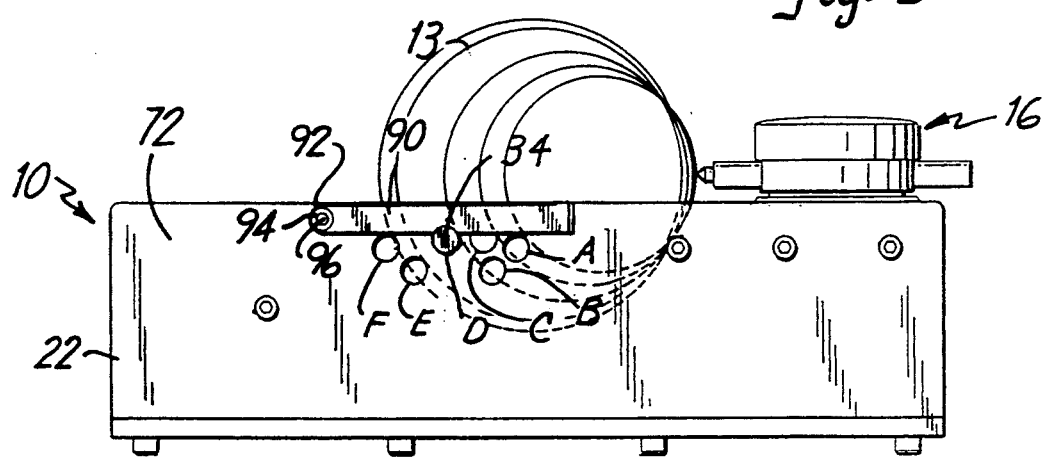
FIG. 3 shows a side view of one embodiment of the improved can tester.

The can tester 10 also includes a latch 90, shown in FIG. 3, positioned on the exterior surface 72 of the first sidewall 22. The latch 90 includes a first end 92 having a hole 94. The latch 90 is secured to the first sidewall 22 by a pivot pin 96, positioned within the hole 94.

The first end 58 and the radial groove 38 extend through the selected hole in the side panel 22 such that the latch 90 engages the groove 38. Once the latch 90 is positioned in the groove 38, movement of the second rod 34 is impeded.

A cap, shown at 40 in FIG. 2, is fitted snugly on the first end 58 of the second rod 34 and is secured to the rod 34 to prevent movement of the second rod 34. The cap 40 includes a lip 41 that is moved into contact with the latch 90 as the cap 40 is secured to the rod 34.

The first rod 32, a stationary rod, is secured to the first sidewall 22 at a position adjacent to hole A and is secured to the second sidewall 24 at a position adjacent to the hole A'. The third rod 33 is also a substantially immovable and stationary rod. The third rod 33 is secured to the first sidewall 22 at a position that is adjacent to the hole F. The third rod 33 is secured to the second sidewall 24 at a position that is adjacent to the hole F'. The third rod 33 is also positioned proximal to the second open end 64 of the main body 12.

The can 13 held in the can tester 10 is contacted by the measuring instrument portion 16 at a point on an exterior surface of the can 13 that is perpendicular to the tangent of the can 13. For one embodiment, the can 13 is contacted by the measuring instrument portion 16 at a point that is in a plane including the axial center of the can 13 that is also parallel to the base 20 of the can tester 10, such as is illustrated in FIG. 3. Cans of different diameter are secured in selected positions within the can tester 10 so that the measuring instrument portion 16 contacts the can 13 at a point on the axial plane that is parallel to the base 20, irrespective of can diameter.

The second movable rod 34 is moved into the aligned holes that permit the can 13 to rest upon the first stationary rod 32 and the second movable rod 34. The can having the largest diameter tested is positioned and is secured between the first stationary rod 32 and the third stationary rod 33. When the can 13 having the largest diameter is positioned in the tester 10, the second rod 34 is removed from the can tester 10.

Figure 5:
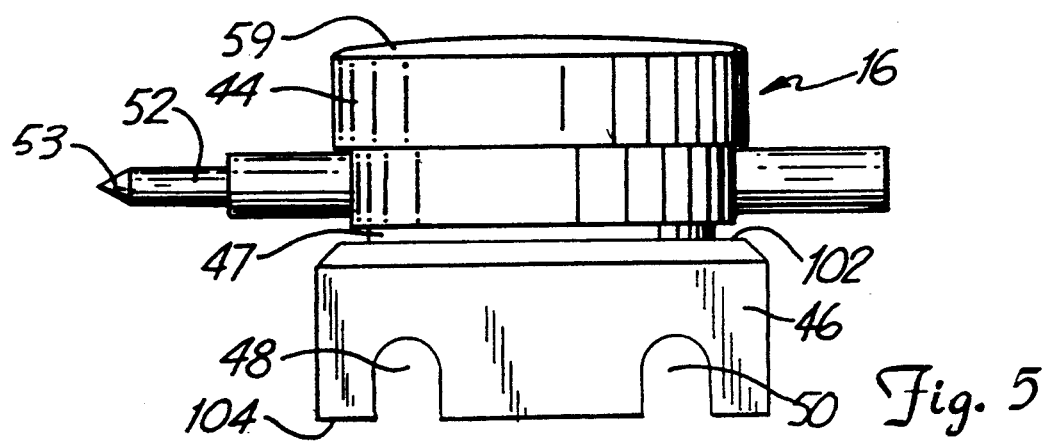
FIG. 5 shows a side view of a measuring portion of the improved can tester.

The measuring portion 16 of the can tester 10, illustrated in FIG. 5, includes an instrument for measuring length 44, a movable support 46 and a mechanism 47 for attaching the measuring instrument 44 to the support 46. In one embodiment, the measuring instrument 44 measures lengths up to about ½ inch. The measuring instrument 44 includes a travel indicator 52 having a contact point 53 that measures length when contacted to and moved along a surface. The travel indicator 52 is horizontally movable in order to maintain a constant horizontal force upon the contact point 53.

The measuring instrument 44 also includes a display 59 that shows the lengths detected by the travel indicator 52 to a user. In one embodiment, the measuring instrument 44, including the travel indicator 52, is manufactured by Mitutayo Corp. of Japan.

The movable support 46 includes a top side 102 and a bottom side 104 opposing the top side 102. The top side 102 of the movable support 46 may be aligned with the measuring instrument 44 by positioning a slot on the top side 102 with a protrusion (not shown) on the measuring instrument 44. In one embodiment, the top side 102 is attached to the measuring instrument 44 by a pair of set screws (not shown) positioned within holes (not shown) in the top side 102.

The bottom side 104 of the movable support 46 includes a pair of grooves 48 and 50. The grooves 48 and 50 are sized and positioned to slidably fit on the first component 17 and the second component 18 for moving the measuring portion 16. The bottom side 104 is made of a material having a reduced coefficient of friction that is substantially unaffected by moisture.

The first component 17 for moving the measuring portion 16 includes a pair of runners, 28 and 30, spanning the base 20 and secured to each of the first and the second sidewalls, 22 and 24, as illustrated in FIG. 2. The runners 28 and 30 are substantially perpendicular to the sidewalls, 22 and 24, and are substantially parallel to each other and are positioned in substantially the same horizontal plane. The runner 28 is positioned proximate to the first open end 62 of the can tester 10.

The second component 18 for moving the measuring portion 16 includes a pair of runners, 54 and 56, substantially parallel to each other. The runners 54 and 56 are attached to each of a pair of opposing brackets, 66 and 68. The brackets are attached to the exterior surface 76 of the second sidewall 24. The runners 54 and 56 are substantially parallel to the exterior surface 76 of the second sidewall 24.

A can 13 to be tested may be tested along its length or along its diameter. If the can 13 is to be tested along its length, the measuring instrument portion 16 is positioned so that the runners 28 and 30 are contacted by grooves 48 and 50 in the support 46 of the instrument portion 16. The instrument portion 16 is positioned so that the contact point 53 of the travel indicator 52 contacts the can 13, as shown in FIG. 3.

Once in the can tester device 10, the can 13 is positioned at a uniform distance from the measuring instrument 16 by aligning the can 13, lengthwise, with the first stationary rod 32 so that the can abuts the rod 32. Because the first rod 32 is an immovable rod, the second rod 34, once secured, is immovable and the runners 28 and 30 are also immovable, the plane of contact between the instrument portion 16 and the can 13 is made uniform, irrespective of can diameter. The plane of contact is one where the contact point 53 of the measuring instrument 44 contacts a point on the exterior surface of the can 13 that is in a plane that passes through the axial center of the can 13 and that is parallel with the base 20 of the tester 10.

Can sizes that may be measured in the can tester 10 are described in Table 1.

TABLE 1

| Size | Dimensions |
|---|---|
| 211 × 300 | 2 11/16 in. × 3 in. |
| 211 × 304 | 2 11/16 in. × 3¼ in. |
| 211 × 400 | 2 11/16 in. × 4 in. |
| 211 × 510 | 2 11/16 in. × 5⅝ in. |
| 300 × 407 | 3 in. × 4 7/16 in. |
| 300 × 510 | 3 in. × 5⅝ in. |
| 303 × 308 | 3 3/16 in. × 3½ in. |
| 307 × 512 | 3 7/16 in. × 5¾ in. |
| 307 × 306 | 3 7/16 in. × 3⅜ in. |
| 401 × 411 | 4 1/16 in. × 4 11/16 in. |
| 401 × 602 | 4 1/16 in. × 6 1/ in. |
| 404 × 700 | 4¼ in. × 7 in. |
| 603 × 600 | 6 3/16 in. × 6 in. |
| 603 × 700 | 6 3/16 in. × 7 in. |

Once the grooves 48 and 50 of the support 46 of the instrument portion 16 are positioned on runners 28 and 30, the instrument portion 16 is passed along the length of the can 13. In one embodiment, the instrument portion 16 is moved along the runners 28 and 30 by a user. In another embodiment, the instrument portion 16 is mechanically propelled along the runners 28 and 30. The instrument portion 16 is removable from the runners 28 and 30 by merely lifting from the runners.

While passed along the length of the can 13, the measuring instrument 16 measures the distance displaced as the traveling indicator 52 moves along the length of the can 13. In one embodiment, the distance includes a distance traveled between a crown 5 of a ridge 3 and a base 7 of a valley pre-made on the can 13. The distances measured are compared to acceptable distances of standard cans having a standard distance between crown 5 of a ridge 3 and base 7 of a valley for the can size under consideration.

If the distance measured is less than acceptable with respect to the can size standard, the can is rejected as being overpressurized. If the distance measured is greater than a standard, the can will also be rejected.

The can 13 may also contain ridges and valleys (not shown) on at least one of its ends. These ridges and valleys are also measurable in the can tester device 10. In this case, grooves 48 and 50 of the instrument portion 16 are aligned along runners 54 and 56. The can 13 is positioned to abut the second wall 24 of the can tester 10. The contact point 53 of the traveling indicator 52 contacts the can 13 once the can 13 is positioned against the second side panel 24. The distance traveled over a ridge and a valley is measured by the measuring instrument 16.

The measured distance is once again compared to a standard. If the measured distance is less than the standard, the can 13 may be rejected as being too long. Additionally, if the height of the ridge 3 is too small, the can 13 may be rejected as being underpressurized.

In addition to measuring lengths between the crown and the base of a ridge 3 pressed into the can 13, the can tester 10 may also be used to measure the overall length of a can 13 and the diameter of the can 13. The length and the diameter of a tested can 13 are also compared to the length and diameter of a standard can. Cans having a length or a diameter that falls outside of an acceptable range are rejected from use or sale.

The method for testing a can also includes an embodiment where the measuring instrument portion 16 is in communication with a computer device. In this embodiment, the measuring instrument portion 16 communicates to the computing device measurements of distance as the instrument is passed along a can. The measuring device may communicate the distance measurements by an electronic conveyance or by telemetry. The computing device may include standard values of length and unacceptable deviations from the standard.

Although the present invention has been described with reference to preferred embodiments, workers skilled in the art will recognize that changes may be made in form and detail without departing from the spirit and scope of the invention.

What is claimed is:

1. A device for testing cans having an axial center comprising:
    a main body having a base, a first side panel attached to the base and a second side panel opposing the first side panel attached to the base;
    a movable measuring instrument portion, moving in the main body;
    a means for moving the measuring instrument portion in the main body comprising a first runner and a second runner parallel to the first runner, the runners attached to a first bracket and a second bracket, the brackets attached to the second side panel; and
    a means for positioning and confining the can between the first and second side panels so that the measuring instrument portion contacts a can in a plane running through the axial center of the can.

2. The device of claim 1 wherein the means for moving the measuring instrument portion comprises a third runner and a fourth runner parallel to the third runner, the runners being attached to each of the first side panel and the second side panel.

3. The device of claim 1 wherein the means for positioning and confining a can comprises a first immovable rod and a second immovable rod, each immovable rod attached to the first side panel and the second side panel, the immovable rods positioned to secure the can between the rods.

4. The device of claim 1 wherein the means for positioning and confining a can comprises a first immovable rod, a third movable rod, a plurality of holes in the first side panel and a corresponding plurality of holes in the second side panel, wherein the third movable rod is positioned in corresponding holes of the plurality of holes in order to secure a can between the first immovable rod and the third movable rod.

5. A method for measuring overpressurization of cans with respect to a standard can having a ridge and a valley pressed into a radial surface of the can, the method comprising:

providing a device comprising:
  a main body having a base, a first side panel attached to the base and a second side panel opposing the first side panel attached to the base;
  a movable measuring instrument portion, moving in the main body;
  a means for moving the measuring instrument in the main body; and
  a mechanism for positioning and confining the can between the first and second side panels, having a first immovable rod, a second movable rod, a plurality of holes in the first side panel and a corresponding plurality of holes in the second side panel, wherein the second movable rod is positioned in corresponding holes of the plurality of holes;
positioning the can in the device so that the can abuts the first immovable rod in a lengthwise fashion;
positioning the movable rod in a pair of corresponding holes so that the can is contacted by the measuring instrument portion at a point within a plane that includes an axial center of the can;
contacting the measuring portion to the can, measuring a distance between a crown of the ridge and a base of the valley pressed into the can; and
comparing the distance with a standard can distance.

6. The method of claim 5 and further including moving the measuring portion so that the measuring portion contacts the can at a crown of the ridge and a base of the valley and that measures a distance between the crown and the base.

7. The method of claim 5 and further including moving the measuring portion so that the travelling indicator contacts the can and measures a length of the can.

8. The method of claim 5 wherein the means for moving the measuring portion comprises a first runner and a second runner parallel to the first runner, each runner attached to the first side panel and the second side panel for moving the measuring instrument portion between the first and the second panels.

9. The method of claim 5 wherein the means for moving the measuring instrument portion comprises a third runner and a fourth runner parallel to the first runner, each runner attached to a first bracket and a second bracket, the brackets attached to the second panel.

10. The method of claim 9 wherein the measuring instrument portion contacts a radial end of the secured can.

11. The method of claim 10 wherein the contacted measuring instrument portion measures the diameter of the radial end.

* * * * *